Feb. 6, 1951

F. B. JOHNSON 2,540,335

LATERAL CONTROL DEVICE FOR AIRCRAFT

Filed Nov. 4, 1946

Witness:
Enea A. Campouri

INVENTOR.
Francis B. Johnson,
BY Walter J. Jason
ATTORNEY

Feb. 6, 1951 F. B. JOHNSON 2,540,335
LATERAL CONTROL DEVICE FOR AIRCRAFT
Filed Nov. 4, 1946 2 Sheets-Sheet 2
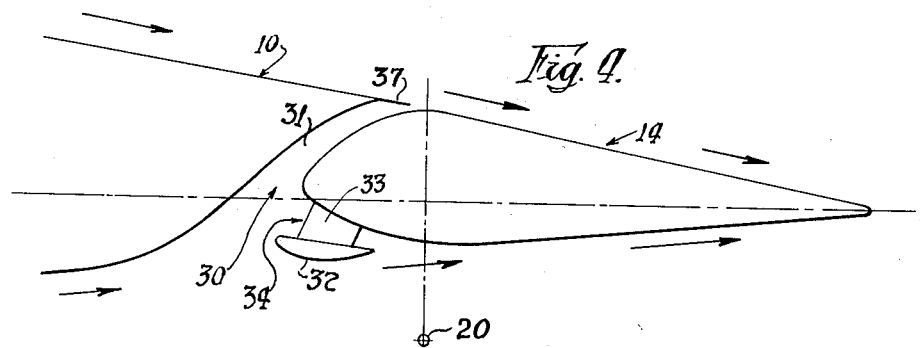
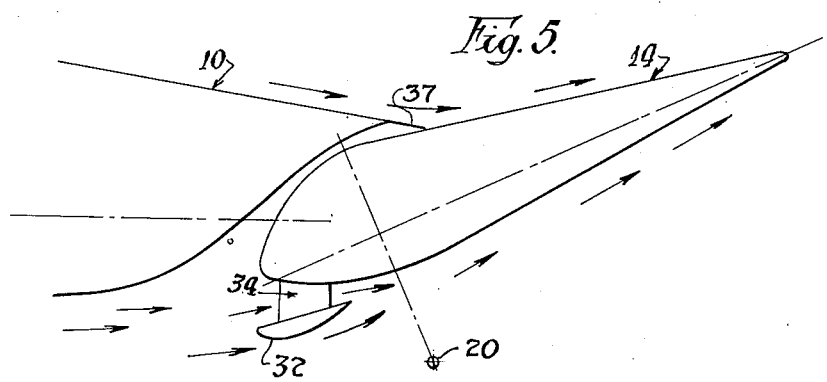
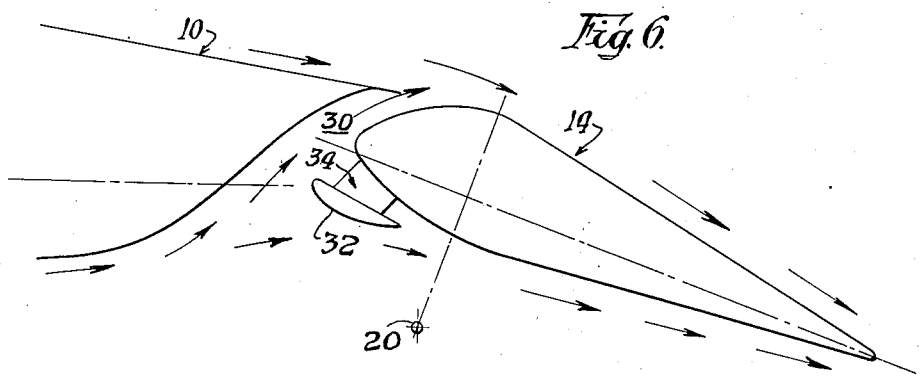
INVENTOR.
Francis B. Johnson,
BY Walter J. Jason
ATTORNEY
Witness:
Enea A. Campouri Patented Feb. 6, 1951

2,540,335

UNITED STATES PATENT OFFICE 2,540,335

LATERAL CONTROL DEVICE FOR AIRCRAFT

Francis B. Johnson, Burbank, Calif., assignor to Consolidated Vultee Aircraft Corporation, San Diego, Calif., a corporation of Delaware Application November 4, 1946, Serial No. 707,600

8 Claims. (Cl. 244—90)

1

This invention relates to airplane control devices and more particularly to an improved aileron arrangement.

The primary purpose of this invention is to provide an improved means for effecting lateral control of an airplane. Conventionally, lateral control or the control of the bank and turn movements of an airplane has been accomplished by means of ailerons, auxiliary airfoil surfaces, disposed near each of the outer ends or tips of the wings and interconnected for common movement, but with one aileron surface being adapted to be deflected in one direction while the other is deflected in the opposite direction whereby each effects a different change in lift on the respective wings with which the ailerons are associated. Deflection of the ailerons by reason of their effecting changes in lift will cause the airplane to turn, the direction of turn being dependent on the direction of deflection of the ailerons. Thus, to secure a turn to the left, the right aileron is deflected downwardly and the left aileron is deflected upwardly, which results in an increased upward lift on the right side and a decreased lift on the left side. The effectiveness of an aileron is measured by the degree of deflection that may be secured in either direction before separation of airflow from the aileron surface occurs and a turbulent condition is set up. Deflection to points beyond which air separation occurs greatly increases the drag on the airplane without adding materially to the lift. There will be also a marked increase in the force required to control the ailerons. The object of the present invention is to provide an aileron arrangement which permits for greater deflection of the aileron in both the upward and the downward directions. Suggestions have been made prior to my invention for securing greater deflections of ailerons. Such suggestions include the provision of slots between the trailing edge of the wing and the aileron which are effective to increase the downward deflection of the aileron or as in U. S. Letters Patent No. 2,403,770 to incorporate an auxiliary airfoil on the under surface of the aileron to secure greater upward deflections. In my invention I effect an arrangement whereby greater deflection of the aileron is secured in each direction of its movement.

Therefore, an object of the present invention lies in the provision in an airplane wing of an improved form of lateral control device.

Another object of the invention is to provide an improved aileron arrangement for an airplane embodying means for effecting an accelerated flow of air over the aileron in each direction of movement.

Still another object of the invention is the provision in an airplane wing of an aileron adapted to be deflected effectively in both upward and downward directions an amount greater than normally obtained with conventional ailerons.

A further object of the invention resides in providing an airplane wing carrying an aileron, with an aerodynamic slot provided between the wing and the aileron, and with an auxiliary airfoil supported by the aileron which provides a second aerodynamic slot between itself and the aileron.

Other objects and features of this invention will be readily apparent to those skilled in the art from the following specification and appended drawings illustrating a preferred embodiment in which.

Figure 1:
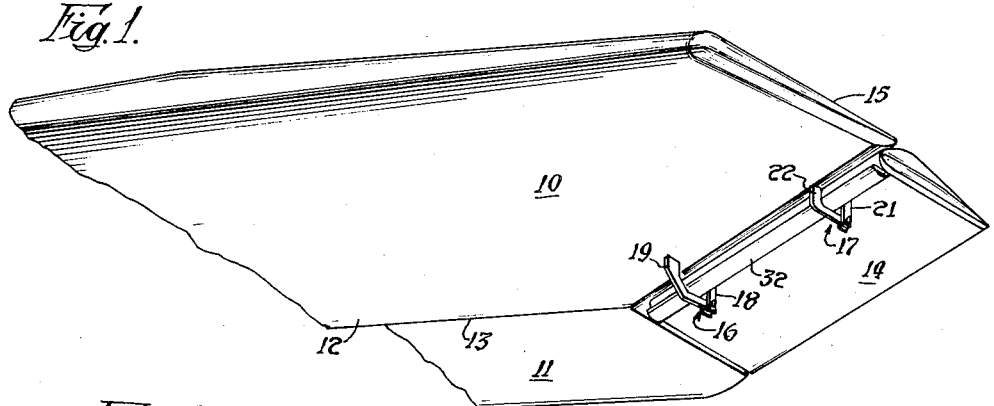
Figure 1 is a perspective view of a portion of an airplane wing and an aileron arrangement according to the present invention.
Figure 2:
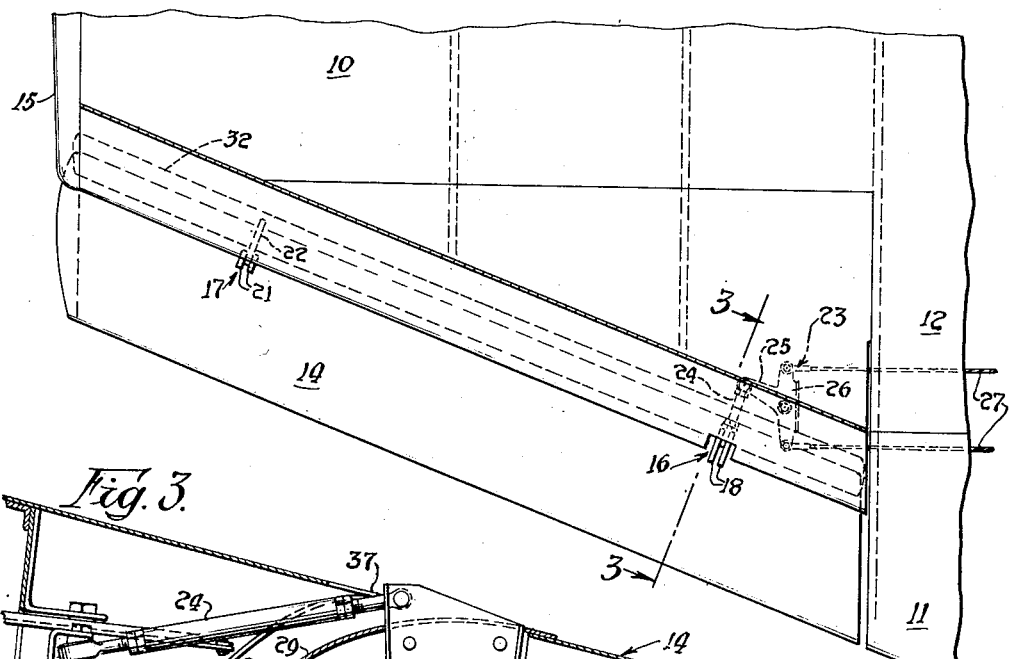
Figure 2 is a bottom plan view.

Figures 4, 5, and 6 are diagrammatic views illustrating various positions assumed by the aileron arrangement of the present invention.

With further reference to the drawings, there is illustrated an airplane wing indicated generally at 10 having embodied therein conventional structural frame-work comprising longitudinal spar members and transverse rib members. A usual wing lift increasing flap 11 is hingedly secured to a fixed portion 12 of the wing 10 at the rear edge 13 thereof and extending spanwise therealong. An aileron 14 is disposed immediately adjacent the flap 11 and extends spanwise from the lateral edge thereof to the outer edge 15 of wing 10. A pair of hinge members 16 and 17 mount the aileron 14 to the wing 10. The hinge member 16 is comprised of a bracket 18 and a generally L-shaped member 19, with the bracket 18 being secured to the aileron 14 and extending downwardly therefrom and which is pivotally mounted as at 20 on the generally L-shaped member 19 which in turn is carried by the main wing 10 and extends rearwardly thereof. Hinge member 17 is similarly constituted, comprising a bracket 21 secured to the aileron 14 which bracket 21 is pivotally joined to a generally L-shaped member 22 provided on wing 10. To pivotally move the aileron 14 between its uppermost and lowermost limiting positions there is provided within the wing 10 an actuating mechanism 23.

The actuating mechanism 23 comprises a link element 24 pivotally connected at one end to the hinge bracket 18 mounted on aileron 14. The opposite end of link element 24 is pivotally joined to an arm 25 provided by a bell crank lever 26, suitably pivotally supported on the wing structure. A pair of control cables 27 under the control of the pilot are connected to the bell crank lever 26 whereby rotative movement thereof in opposite directions may be effected by the pilot to move the aileron 14 upwardly and downwardly to desired positions.

Figure 3:
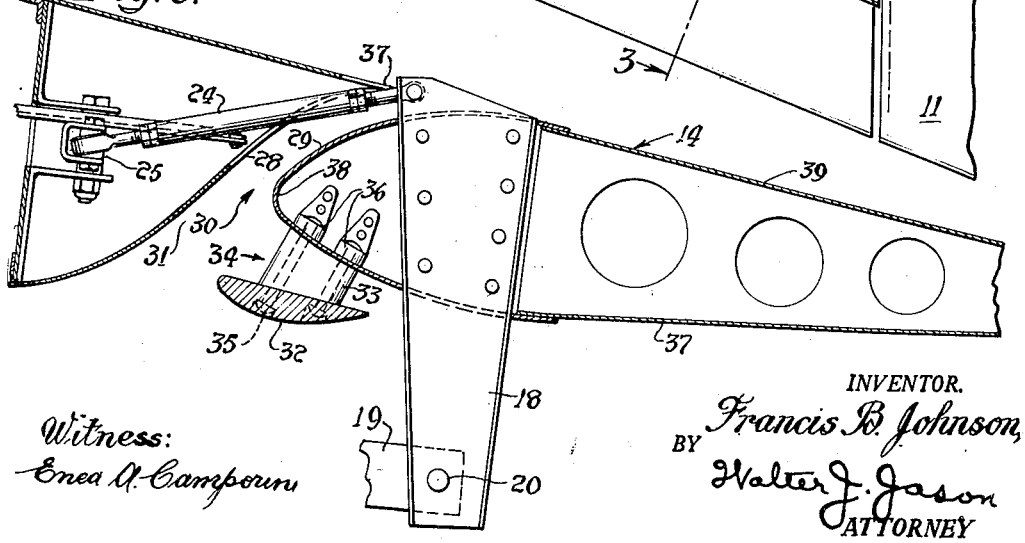
Figure 3 is a sectional view, on an enlarged scale, taken on the line 3—3 of Figure 2.

The underside of the trailing edge of wing 10, adjacent the aileron 14, as particularly shown in Figure 3, is so shaped as to form a recess 31, the recess 31 being defined by a curving wall surface 28, which curving wall surface 28 resolves into a thin overhanging portion 37. The aileron 14, as shown, is tapered toward its forward end, as at 29, which forward end is adapted to lie beneath the overhanging portion 37 and to extend into the recess 31. The forward end 29 of aileron 14 is located spaced from the curving wall surface 28 of wing 10 to thereby effect an aerodynamic slot 30.

Fixedly attached to the aileron 14 at the forward lower end thereof and located therebelow is an elongated slat or auxiliary airfoil 32. A plurality of spacer elements 33 locate the slat 32 spaced from the aileron 14 to form an aerodynamic slot 34. Bolts 35 passing through slat 32 and the spacers 33 and their cooperating nuts 36 secure the slat 32 to the aileron 14. As is seen from the drawings the slat or auxiliary airfoil 32 lies in an inverted position and has a negative incidence with respect to wing 10.

It is readily seen from the drawings that the hinge structure utilized by the aileron 14 of the present invention causes the hinge line or pivotal axis thereof to lie rearwardlyy of wing 10 and below the lower surface 37 of aileron 14 and further the leading edge 38 of aileron 14 lies ahead of and above this hinge line. It is here noted that the contour of aileron 14 is such that in its neutral position it lies wholly or substantially entirely within the envelope section of the main airfoil 10. As is shown, the contour of the upper surface 39 of the aileron 14 is a curve that becomes tangent to the upper main envelope above or slightly aft of the aileron hinge line. The contour of the lower surface 37 of aileron 14 comprises a curve that becomes tangent to the lower main envelope contour above and slightly aft of the aileron hinge line. The lower surface 37 of aileron 14 thus constitutes substantially a continuation of the lower surface of the fixed wing 10 and the upper surface 39 of the aileron 14 effects a substantial continuation of the upper surface of this wing. It is further noted that in the neutral position of aileron 14 a substantial portion of the slat or auxiliary airfoil 32 lies disposed within the envelope section of the main wing 10.

As has been stated hereinbefore, the amount of deflection of an aileron that is desirable is limited to the angular range in which there will be no separation of airflow from the aileron for any deflection beyond this range is not useful. With the aileron arrangement hereinbefore described the angular range of effective deflection is substantially increased, with the aileron being deflectable to a greater degree in both the up and down directions.

Arranging the contours of the aileron 14 and of the trailing edge of the main wing 10 as shown provides the aerodynamic slot 30 which will cause a sheet of air at high velocity to be directed over the upper surface of the aileron 14 when the aileron is deflected to positive angles or downwardly into the airstream as in Figure 6. This accelerated sheet of air tends to maintain the flow of air over the upper surface of the aileron and a greater deflection thereof can be obtained before separation occurs with a consequent improvement in lift.

The aerodynamic slot 34 provided by the auxiliary airfoil 32 spaced from the bottom surface of aileron 14 is operative to direct smooth flowing and accelerated air along the lower surface of the aileron 14 when the aileron is deflected to negative angles or upwardly as in Figure 5, which movement projects the auxiliary airfoil 32 into the airstream and presents the aerodynamic slot 34 as a passage through which the airstream can flow. To effect an acceleration of airflow the slot 34 tapers from its inlet opening and toward its outlet. As is seen from the drawings the rear portion of the auxiliary airfoil 32 is located closer to the defining lower surface 37 of the aileron than is the forward portion to provide, in effect, a Venturi passage. Thus air entering at the forward end of the slot 34 emerges at a higher velocity due to this particular construction of the slot 34. This accelerated air is deflected, as hereinbefore stated, by the slat 32 to travel smoothly along the lower surface of aileron 14 and acts to maintain the airstream thereon and the aileron may be deflected upwardly to a greater degree than normally before separation occurs. In this latter position, slot 30 is closed to airflow by reason of the engagement of the overhanging portion 37 by the upper surface 39 of the aileron 14. It is noted that when the aileron 14 is in its upwardly deflected position that only the auxiliary slat 32 extends into the airstream and that no part of the forward or balance end of the aileron projects thereinto to spoil the airstream flow.

Providing an aileron that can be deflected to greater angles than normal will permit, if desired, a reduction in the length of aileron span required to obtain a desired rate of roll. As has been found by tests the span can be reduced from the usual 40 or 45% of the wing span to 25 or 30% of the wing span. This reduction in aileron span permits an increase in the flap span which results in an appreciable increase of the wing maximum lift. In turn an increase in maximum lift permits for reduction in take-off and landing distance required by the airplane. These advantages are obtained without a sacrifice of desirable aileron characteristics, such as low hinge moments, low adverse yawing moments or control forces and control positions that vary with rolling effectiveness in a substantially lineal relationship; further, the structural weight and cost are comparable to conventional types. The drag due to greater deflections of the aileron is counteracted by the reduction in aileron span length and by the improvement in the lift characteristics of the wing.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In combination with an airplane wing, an aileron, means hingedly connecting said aileron to said airplane wing for upward and downward movement and locating it spaced from an edge of said wing, a wall surface of said wing cooperating with the forward end of the aileron to provide an air passage between said wing and said aileron closable upon upward movement of said aileron, the axis of said hinge means being disposed beneath the aileron and rearwardly of said wing, an inverted auxiliary airfoil, means mounting said auxiliary airfoil to the bottom surface of said aileron and holding it spaced therefrom to provide a Venturi air passage between said auxiliary airfoil and said aileron and means for deflecting said aileron upwardly to close said first mentioned air passage and to place said Venturi air passage defined by said auxiliary airfoil in position in the airstream to cause air to pass at an accelerated rate onto said bottom surface of said aileron.

2. In combination with an airplane wing, an aileron, means pivotally mounting said aileron at the trailing edge of said airplane wing, the axis of said pivot means lying beneath said aileron, means to deflect said aileron upwardly and downwardly, a wall surface of said airplane wing cooperating with the forward end of said aileron to effect a closable air slot at the rear of said airplane wing adapted, when open and with the aileron deflected downwardly, to pass air from beneath said airplane wing onto the top surface of said aileron and at an accelerated rate, means provided by said airplane wing and cooperating with said aileron to open and close said air slot, an inverted auxiliary airfoil, and means mounting said auxiliary airfoil to the bottom surface of said aileron and holding it spaced therefrom to provide an air passage between said auxiliary airfoil and said aileron, which air passage tapers inwardly from its inlet to its outlet.

3. In combination with an airplane wing, an aileron, means hingedly mounting said aileron at the rear of said airplane wing, the axis of said hinge means being disposed beneath said aileron and rearwardly of said airplane wing, means to deflect said aileron upwardly and downwardly, a wall surface on said airplane wing spaced from the forward portion of said aileron and cooperating therewith to define an air slot whereby air may flow from beneath said wing and be discharged at an accelerated rate over the top surface of said aileron when said aileron is deflected downwardly, an inverted auxiliary airfoil, means mounting said auxiliary airfoil on said aileron and in spaced relation to the lower surface thereof and arranged to define an air passage that tapers inwardly from its inlet to its outlet, which air passage serves to pass air at an accelerated rate onto the lower surface of said aileron when said aileron is deflected upwardly.

4. In combination with an airplane wing, an aileron, means hingedly mounting said aileron at the rear of said airplane wing, the axis of said hinge means being disposed beneath said aileron and rearwardly of said airplane wing, means to deflect said aileron upwardly and downwardly, a wall surface on said airplane wing spaced from said aileron and cooperating with the forward end thereof to provide an air passage whereby air may flow from beneath said wing and be discharged at an accelerated rate over the top surface of said aileron when said aileron is deflected downwardly, a slat carried by said aileron, an upper wall surface on said slat spaced from the lower wall surface of said aileron and cooperating therewith to define an inwardly tapered air passage therebetween adapted to pass air at an accelerated rate onto said lower wall surface of said aileron when said aileron is deflected upwardly.

5. In combination with an airplane wing, an aileron, means hingedly mounting said aileron at the trailing edge of said airplane wing, the axis of said hinge means being disposed beneath said aileron and rearwardly of said airplane wing, control means to deflect said aileron upwardly and downwardly, a wall surface on said airplane wing spaced from said aileron and cooperating with the forward end thereof to provide an air slot at the rear of said airplane wing adapted to pass air from beneath said airplane wing and to discharge it at an accelerated rate over the top surface of said aileron when said aileron is deflected downwardly, means provided by said airplane wing and adapted to cooperate with said aileron to close said air slot when said aileron is deflected upwardly, an inverted auxiliary airfoil, spacer means mounting said auxiliary airfoil to the lower surface of said aileron and holding it spaced therefrom to define an inwardly tapered air passage therebetween, said auxiliary airfoil arranged relative to said aileron to dispose said tapered air passage normally out of the airstream, said tapered air passage being movable into the airstream by said control means to pass air at an accelerated rate onto said lower wall surface of said aileron when said aileron is deflected upwardly.

6. In combination with an airplane wing, an aileron, means hingedly mounting said aileron at the trailing edge of said airplane wing, the axis of said hinge means being disposed beneath said aileron and rearwardly of said airplane wing, control means to deflect said aileron upwardly and downwardly, a wall surface on said airplane wing defining a recess at the trailing edge thereof into which a portion of said aileron extends, said wall surface being spaced from said aileron and cooperating with a forward wall thereof to define an air passage therebetween whereby air may flow from beneath said wing and be discharged at an accelerated rate over the top surface of said aileron when said aileron is deflected downwardly, means provided by said airplane wing and adapted to cooperate with said aileron to close said air slot when said aileron is deflected upwardly, an inverted auxiliary airfoil, spacer means mounting said auxiliary airfoil to the lower surface of said aileron and holding it spaced therefrom to define an inwardly tapered air passage therebetween which in the neutral position of said aileron is disposed within said recess out of the airstream and being movable into the airstream by said control means to pass air at an accelerated rate onto said lower wall surface of said aileron when said aileron is deflected upwardly 7. In combination with an airplane wing, an aileron, means pivotally mounting said aileron on the trailing edge of said airplane wing and spacing it therefrom, a wall surface of said wing cooperating with the forward end of said aileron to provide an air passage therebetween, the axis of said pivot means being located beneath said aileron and rearwardly of said airplane wing, control means operatively connected to said aileron to deflect said aileron upwardly and downwardly, an overhanging portion provided by said airplane wing adapted to engage the upper surface of said aileron to effect closure of said air passage when said aileron is deflected upwardly, said air passage acting to pass air at an accelerated rate onto the upper surface of said aileron when said aileron is deflected downwardly and said air passage is open, an inverted auxiliary airfoil fixedly carried by said aileron, an upper wall surface on said auxiliary airfoil spaced from the lower wall surface of said aileron and cooperating therewith to provide an inwardly tapered air passage therebetween to pass air at an accelerated rate onto said lower wall surface of said aileron when said aileron is deflected upwardly.

8. In combination with an airplane wing, an aileron, means pivotally mounting said aileron on the trailing edge of said airplane wing, a wall surface on the underside of said airplane wing spaced from the forward end of said aileron and cooperating therewith to define an air passage therebetween, the axis of said pivot means being located beneath said aileron and rearwardly of said airplane wing, control means operatively connected to said aileron to deflect said aileron upwardly and downwardly, an overhanging portion provided by said airplane wing adapted to engage the upper surface of said aileron to effect closure of said air passage when said aileron is deflected upwardly, said air passage acting to pass air at an accelerated rate onto the upper surface of said aileron when said aileron is deflected downwardly and said air passage is open, an inverted auxiliary airfoil, means fixedly mounting said auxiliary airfoil to the lower surface of said aileron and holding it spaced from said lower surface to provide an inwardly tapered air passage between said auxiliary airfoil and said aileron, said auxiliary airfoil arranged relative to said aileron to dispose said tapered air passage normally out of said airstream, said tapered air passage on upward deflection of said aileron by said control means being positioned in said airstream to act to pass air at an accelerated rate onto the lower wall surface of said aileron.

FRANCIS B. JOHNSON.

REFERENCES CITED

The following references are of record in the file of this patent:

FOREIGN PATENTS

| Number | Country | Date |
|---|---|---|
| 176,909 | Great Britain | Mar. 21, 1922 |
| 538,519 | Germany | Nov 14, 1931 |
| 675,530 | Germany | May 11, 1939 |
| 316,587 | Italy | Apr. 10, 1934 |